US009317289B2

(12) United States Patent
Feng et al.

(10) Patent No.: US 9,317,289 B2
(45) Date of Patent: Apr. 19, 2016

(54) ACKNOWLEDGEMENT FORWARDING

(71) Applicant: TELEFONAKTIEBOLAGET L M ERICSSON (PUBL), Stockholm (SE)

(72) Inventors: Michael Feng, Mountain View, CA (US); Edward Ho, Fremont, CA (US); Edmund C. Chen, Sunnyvale, CA (US); Robert Hathaway, Sunnyvale, CA (US)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 627 days.

(21) Appl. No.: 13/730,616

(22) Filed: Dec. 28, 2012

(65) Prior Publication Data
US 2014/0189327 A1    Jul. 3, 2014

(51) Int. Cl.
*G06F 9/38* (2006.01)
*H04L 12/931* (2013.01)
*H04L 12/933* (2013.01)

(52) U.S. Cl.
CPC *G06F 9/38* (2013.01); *H04L 49/00* (2013.01); *H04L 49/1546* (2013.01)

(58) Field of Classification Search
CPC ......... G06F 9/38; G06F 13/28; G06F 13/385; G06F 9/30181; H04L 69/22
USPC ................. 370/237, 394, 469; 707/611, 640; 709/219, 230, 232; 710/22, 28, 30, 5, 710/52; 711/102, 114, 158, 206, 6
See application file for complete search history.

(56) References Cited

U.S. PATENT DOCUMENTS

| 2005/0232303 | A1* | 10/2005 | Deforche et al. | 370/469 |
| 2007/0240161 | A1 | 10/2007 | Prabhakar et al. | |
| 2009/0216993 | A1* | 8/2009 | Venkumahanti et al. | 711/206 |
| 2011/0145450 | A1* | 6/2011 | Mansingh | 710/52 |
| 2013/0114413 | A1* | 5/2013 | Song et al. | 370/237 |

* cited by examiner

*Primary Examiner* — Charles C Jiang
*Assistant Examiner* — Wali Butt
(74) *Attorney, Agent, or Firm* — Nicholson, De Vos, Webster & Elliot, LLP

(57) ABSTRACT

A method for processing data packets in a pipeline and executed by a network processor. The pipeline includes a plurality of logical blocks, each logical block configured to process one stage of the pipeline. Each data packet includes a descriptor and a data. The network processor is coupled to a resource for storing the data. The method reduces latency and enables non-blocking processing of data packets by forwarding a unique identification of a write request from a first logical block to a subsequent second logical block in the pipeline, the write request to modify the data in the resource. The method includes receiving the descriptor for processing at the first logical block, generating the write request and the unique identification for the write request, transmitting the write request to the resource, and transmitting the unique identification towards the second logical block before an acknowledgement is returned by the resource.

16 Claims, 6 Drawing Sheets

ACKNOWLEDGEMENT FORWARDING

FIELD

The embodiments of the invention relate to the field of data packet processing during the routing of the data packet in a telecommunications network. Specifically, the embodiments relate to processing the routing of the data packet in a pipeline implementation.

BACKGROUND

A telecommunications network is a collection of terminals that are connected to each other through communication channels. A terminal is any device capable of communicating with other terminals through the channels. Examples of terminals include telephones, fax machines, cell phones, computers, network enabled printers, and even household electronics and appliances that are capable of communicating with other devices across a network. Terminals communicate with other terminals by sending data, typically in the form of a packet, to each other through the channels. In large networks, the data packets are managed in the channels to ensure proper delivery of the packets to their intended destination terminals and conserve bandwidth of the channels by reducing or eliminating unnecessary transfers to unintended terminals.

One method for managing the data packets in the channels is through the utilization of a routing device placed at a point where multiple channels connect or intersect. After the routing device receives a data packet transferred by a source terminal, the routing device is responsible for processing the data packet. The processing performed by the routing device includes determining the intended destination of the data packet and transmitting the data packet through the proper channel toward the destination terminal. A routing device that is directly connected with the terminals is commonly known in the field as a switch. In contrast, a routing device that connects multiple networks together to form a larger network is commonly known in the field as a router. The processing that is performed by a switch is different from the processing that is performed by a router due to the additional layer of networking that the router must handle. However, in regard to the embodiments of the invention, the two processes have enough commonality such that the term "router" will be used hereinafter to denote any routing device, including the switch and the router as known in the field.

One implementation for the processing of data packets in a router is to process the packets in a pipeline. Since data packets typically have the same data structure, the processing that is performed by the router is identical or similar for each data packet. Thus, a pipeline enables multiple data packets to be processed simultaneously, one at each stage of the pipeline. This allows more data packets to be processed in any given amount of time, thereby increasing the throughput of the router. If during processing, access to a separate computing resource is needed (e.g., writing to or reading from a memory resource that stores data), current pipeline processing methods require a round trip acknowledgement to be returned to the issuer of the access request before further processing in order to ensure data integrity.

SUMMARY

In one embodiment, a method for implementing a pipeline for processing a data packet is executed by a network processor. The pipeline includes a plurality of logical blocks, each of the plurality of logical blocks configured to process a stage of the pipeline. The data packet includes a descriptor and a data. The network processor is coupled to a resource for storing the data. The method to reduce latency and enable non-blocking processing of the data packet by forwarding a unique identification of a write request from a first logical block in the plurality of logical blocks to a second logical block in the plurality of logical blocks that is subsequent to the first logical block. The write request to modify the data in the resource. The method includes receiving the descriptor of the data packet for processing at the first logical block in the pipeline executed by the network processor. The write request and the unique identification of the write request are generated at the first logical block. The write request is transmitted from the first logical block to the resource. The unique identification is transmitted from the first logical block toward the second logical block before an acknowledgement of the write request is returned by the resource.

In another example embodiment, a network processor implements a pipeline for processing a data packet. The pipeline includes a plurality of logical blocks, each of the plurality of logical blocks configured to process a stage of the pipeline. The data packet includes a descriptor and a data. The network processor is coupled to a resource for storing the data. The network processor to reduce latency and enable non-blocking processing of the data packet by forwarding a unique identification of a write request from a first logical block in the plurality of logical blocks to a second logical block in the plurality of logical blocks that is subsequent to the first logical block. The write request to modify the data in the resource. The network processor comprises a receiving module in the first logical block, a processing module in the first logical block, and a transmission module in the first logical block. The receiving module in the first logical block is configured to receive the descriptor of the data packet for processing. The processing module in the first logical block is configured to generate the write request and the unique identification of the write request. The transmission module in the first logical block is coupled to the processing module in the first logical block and configured to transmit the write request from the first logical block to the resource, and further configured to transmit the unique identification from the first logical block toward the second logical block before an acknowledgment of the write request is returned by the resource.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
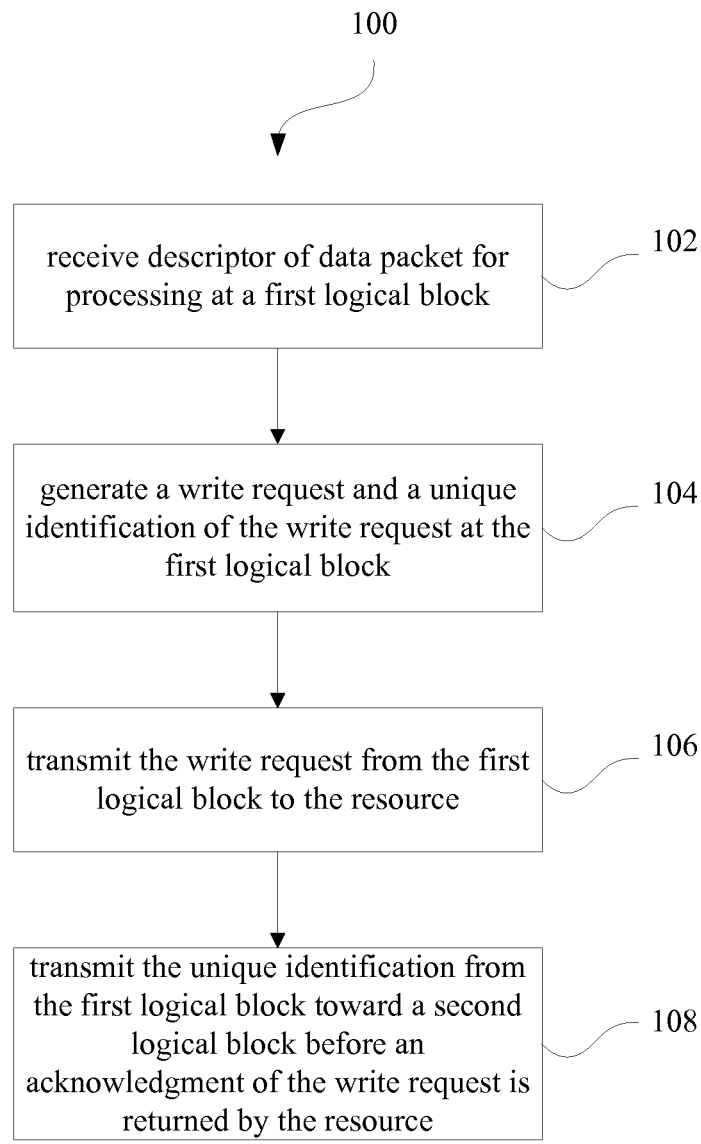
FIG. 1 is a flowchart of one embodiment of a method for processing a data packet in a first logical block of a pipeline.

In the following description, numerous specific details are set forth. However, it is understood that embodiments of the invention may be practiced without these specific details. In other instances, well-known circuits, structures and techniques have not been shown in detail in order not to obscure the understanding of this description. In other instances, control structures, gate level circuits and full software instruction sequences have not been shown in detail in order not to obscure the invention. Those of ordinary skill in the art, with the included descriptions, will be able to implement appropriate functionality without undue experimentation.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

To facilitate understanding of the embodiments, dashed lines have been used in the figures to signify the optional nature of certain items (e.g., features not supported by a given embodiment of the invention; features supported by a given embodiment, but used in some situations and not in others).

The techniques shown in the figures can be implemented using code and data stored and executed on one or more electronic devices. Such electronic devices store and communicate (internally and/or with other electronic devices over a network) code and data using non-transitory tangible computer-readable storage medium (e.g., magnetic disks; optical disks; read only memory; flash memory devices; phase-change memory) and transitory computer-readable communication medium (e.g., electrical, optical, acoustical or other forms of propagated signals—such as carrier waves, infrared signals, digital signals, etc.). In addition, such electronic devices typically include a set or one or more processors coupled with one or more other components, such as a storage device, one or more input/output devices (e.g., keyboard, a touchscreen, and/or a display), and a network connection. The coupling of the set of processors and other components is typically through one or more busses or bridges (also termed bus controllers). The storage device and signals carrying the network traffic respectively represent one or more non-transitory tangible computer-readable medium and transitory computer-readable communication medium. Thus, the storage device of a given electronic device typically stores code and/or data for execution on the set of one or more processors of that electronic device. Of course, one or more parts of an embodiment of the invention may be implemented using different combination of software, firmware, and/or hardware.

Data transfers across a telecommunications network depend on a variety of different elements in the network, including the medium through which the transfers occur and the devices which facilitate the transfers. One particular device for facilitating such transfers is a router. A router is placed at points in the network where communication channels meet or intersect. These channels can be channels of the same network or channels of different networks, in which case the router connects the different networks together to form a larger network. The router is responsible for routing the data to the proper channel for transmission to the intended destination. This reduces the amount of traffic on the network by not transmitting the data through unnecessary channels.

The embodiments of the invention provide a method and system for routing data packets in a telecommunications network by processing the data packets in a pipeline. A pipeline includes multiple stages of processing, and is capable of processing a different data packet at each stage simultaneously. A "logical block" will be used hereinafter to denote a processing element that performs a single stage of processing in the pipeline. Logical blocks can be implemented using any combination of software, firmware, and/or hardware. In some embodiments, each logical block is a distinct hardware processor or a distinct physical portion of a hardware processor. In other embodiments, multiple logical blocks are implemented by firmware or software on a single hardware processor capable of processing multiple threads of instructions simultaneously.

During the processing of the data packets, the network processor may access a separate computing resource to assist with the processing. The resource is typically coupled with the processor to allow data transfers between the resource and the processor. For example, if a stage of processing includes reading from or writing to a memory resource capable of storing data, the logical block that is performing the processing transmits a request to the memory resource to perform the respective operation. In some embodiments, the resource can also be another processor, instead of a memory resource, for performing functions or operations on the data. As used herein, a resource is any hardware element used during the computation of data, including processors and memory. Memory may refer to any memory device capable of storing data for any amount of time, including volatile and non-volatile memory. Furthermore, memory can be implemented within a processor (i.e. on the same chip) or separately as a distinct piece of hardware.

The disadvantages of the prior art include that current processing pipelines for routing data packets require a round trip acknowledgement for each resource access request to be returned to the issuing logical block before passing the data packet on to the next logical block for further processing. Each acknowledgement will incur a respective latency due to this roundtrip requirement. Therefore, the overall acknowledgement latency will be a multiple of the number of data packets processed.

The embodiments of the present invention overcome the disadvantages of the prior art by implementing an acknowledgment forwarding process. This allows an issuing logical block to generate a request for a resource, and the resource to generate a completion acknowledgement that is sent to a different logical block other than the issuing logical block for further processing. The advantages of the embodiments described herein are that (1) the transmission latency of the processing job can be hidden while the request is being issued, (2) the issuing logical block can be non-blocked by the request completion, (3) the total latency of a processing job can be reduced, and (4) the rate of logical block processing can be limited by the number of unique write acknowledgements that are identified at the destination logical block, rather than the response latency of the acknowledgement.

FIG. 1 is a flowchart of one embodiment of a method for processing a data packet in a first logical block of a pipeline. As used herein, the first logical block is not necessarily the logical block that performs the first stage of processing in the pipeline. Rather, the "first" designation is only used as an identifier to distinguish one logical block from the other logical blocks of the pipeline. Thus no other meaning should be implied from the designation. The same holds true for references to a "second" or "third" logical block hereinafter.

In one embodiment, the process starts at Block 102 when the first logical block of the pipeline receives a descriptor of a data packet for processing. A data packet typically includes a descriptor portion (also known as the header) and a user data portion (also known as the payload). The descriptor contains control information for the packet, such as the intended destination terminal. In contrast, the user data is the substantive portion of the packet and contains the actual data that is being communicated by the terminals. Hereinafter, the user data or payload will be referred to as simply the "data."

The descriptor is typically transmitted to the pipeline processor from an ingress port of the router. The ingress port is coupled with a communication channel (e.g., a network cable) of the network and receives incoming data packets for the router. In contrast, an egress port transmits data packets out from the router into the network. In some embodiments, the ingress port and the egress port can be implemented as a single port capable of performing both the receiving and the transmitting of data packets. Such dual function ports are typically known in the field as transceiver module ports because of their capability to both transmit and receive data packets.

Since the descriptor is received by the router as part of the entire data packet, the descriptor is typically extracted from the data packet before further processing is performed. In some embodiments, the extraction, as well as other processing on the descriptor, can be performed before the descriptor is received by the first logical block of the pipeline. This extraction process can be performed at an earlier stage of the pipeline, or it can be performed by a separate network processor before the descriptor reaches the pipeline.

In other embodiments, the entire data packet, including both the descriptor and the data, is received by the first logical block before any extraction has occurred. The first logical block can extract the descriptor from the data packet as part of the processing that is performed by the first logical block. Alternatively, the descriptor can be extracted from the data packet at a subsequent stage of processing.

The processing that is performed by the first logical block includes accessing a separate resource. The access can be a request on the resource to perform any operation on the data packet, including a read operation, a store operation, a modify operation, or some other form of processing on the data packet. In most cases, the operation is performed on the data portion of the packet. In one embodiment, the access is for a write operation, which can include storing the data or modifying the data that was previously stored. For the sake of clarity, the Figures and examples described hereinafter all recite a write operation. However, this should not be interpreted as a limitation on the embodiments since the methods described herein are applicable to any resource access, not just write operations.

At Block 104, the first logical block generates a write request for the write operation, including a unique identification for the write request. The unique identification enables the tracking of the request and allows an acknowledgment that is received from the resource to be matched to the request. The unique identification is a part of the write request, and thus any references to a write request hereinafter should be understood as including the unique identification for that write request, even if not explicitly stated.

At Block 106, the write request, including the unique identification, is transmitted from the first logical block to the resource. The resource is coupled with the first logical block or with the processor executing the first logical block. The resource can be a memory device that carries out the write request directly, or the resource can be another network processor that carries out the request by further transmitting the request to a memory device.

Furthermore, the resource can reside on the same chip or die as the processor, it can be a separate chip but reside on the same circuit board as the processor, or it can reside on a separate circuit board. A router typically includes multiple circuit boards, known as line cards (see FIGS. 3 and 6 and the related discussions below for more details), and in turn each line card includes one or more processors and one or more memory devices. Thus, the write request can be intended for any of the processors or memory devices in the router, or even a processor or memory device located outside of the physical router.

At Block 108, the unique identification of the write request is transmitted from the first logical block towards a second logical block before an acknowledgement for the write request is returned by the resource. Depending on the implementation of the logical blocks (i.e. software, firmware, and/ or hardware), the unique identification can be transmitted using different techniques. For example, the unique identification can be transmitted by simply passing a pointer to a location in memory where the unique identification is stored. Alternatively, the unique identification itself can be transmitted towards the second logical block.

In one embodiment, the descriptor is also transmitted along with the unique identification towards the second logical block. In another embodiment, the unique identification can be written to the descriptor before transmission, such that transmission of the unique identification is accomplished by simply transmitting the descriptor. Furthermore, as with the unique identification, the descriptor can be transmitted by a pointer or by actually transmitting the descriptor. Typically, the descriptor will not be transmitted from the first logical block until all of the processing is complete at the first logical block.

Figure 2:
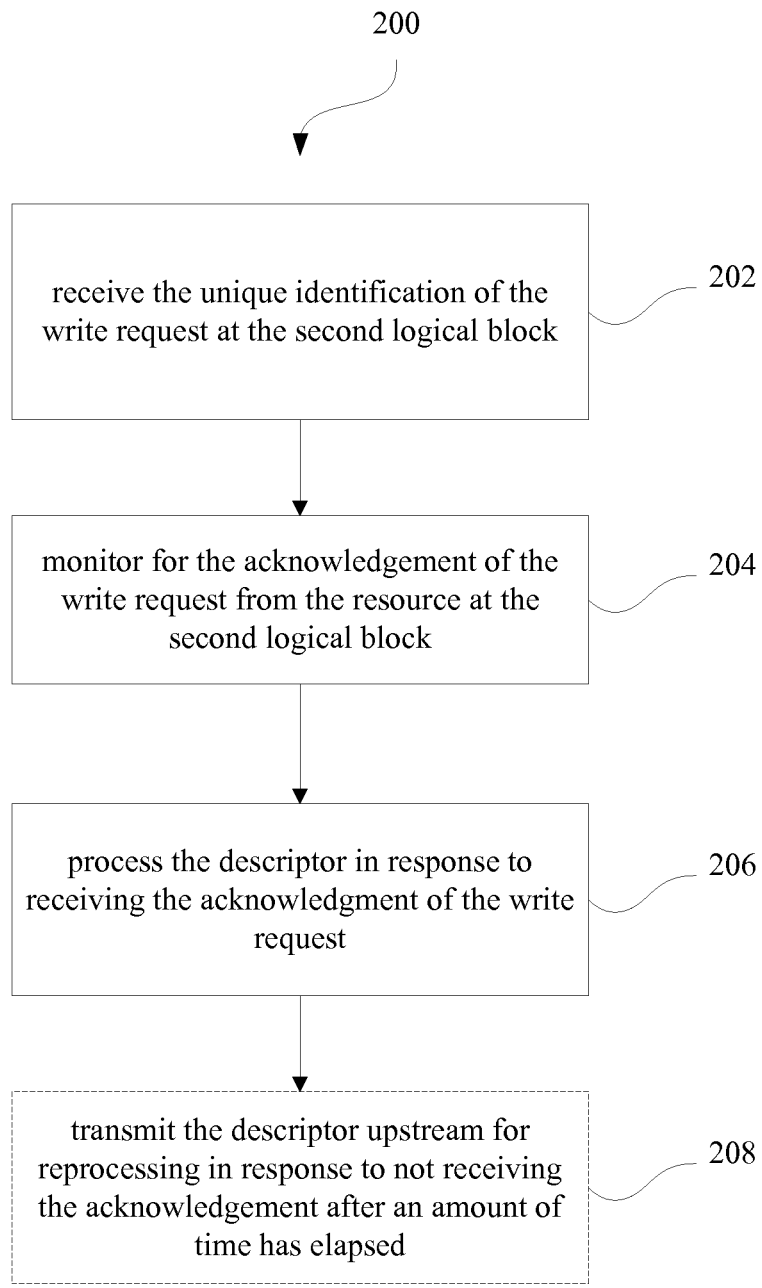
FIG. 2 is a flowchart of one embodiment of a method for processing a data packet in a second logical block that is subsequent to a first logical block of a pipeline.

FIG. 2 is a flowchart of one embodiment of a method for processing a data packet in a second logical block that is subsequent to the first logical block in the pipeline. While it is possible for the second logical block to immediately follow the first logical block in the order of processing in the pipeline, the second logical block will typically be separated from the first logical block by other logical blocks in between.

In one embodiment, the process is started in response to receiving the unique identification of the write request at the second logical block (Block 202). In another embodiment, the descriptor can be received along with the unique identification. Furthermore, as noted above, either the unique identification or the descriptor can be received through a pointer to a location in memory where the information is stored.

After the unique identification is received, the second logical block monitors for an acknowledgement for the write request from the resource (Block 204). In one embodiment, the monitoring is being done while other processes are being performed by the second logical block. In other words, some processing can be performed on the unique identification or descriptor before the acknowledgement is received.

The monitoring and receiving of the acknowledgement can be implemented using several different techniques. The acknowledgement can be stored at a predetermined location in a register or other type of memory when received. In one embodiment, an interrupt signal can be used as an indication to the second logical block that the acknowledgement has been received. In another embodiment, the second logical block checks the location in memory at regular intervals to determine if the acknowledgement has been received.

After the acknowledgement is received, the second logical block will typically perform some additional processing on the descriptor (Block 206). This processing can include transmitting the descriptor to another logical block, or even a different network processor, for additional processing. In one embodiment, if no additional processing is necessary for the data packet, the data packet including the processed descriptor and data can be transmitted to an egress port of the router.

Optionally, the second logical block can be configured to process the unique identification and/or descriptor if the acknowledgement is not received after a predetermined amount of time has elapsed. In one embodiment, the amount of elapsed time is calculated based on the time at which the unique identification/write request was generated. However any suitable means for measuring elapsed time can be used (e.g., from the time that the second logical block receives the unique identification or begins processing the unique identification). The processing that is performed after the amount of time has elapsed will typically include transmitting the descriptor upstream in the pipeline for reprocessing at the first logical block (Block 208). The processing can also include trashing or discarding the unique identification of the write request.

Figure 3:
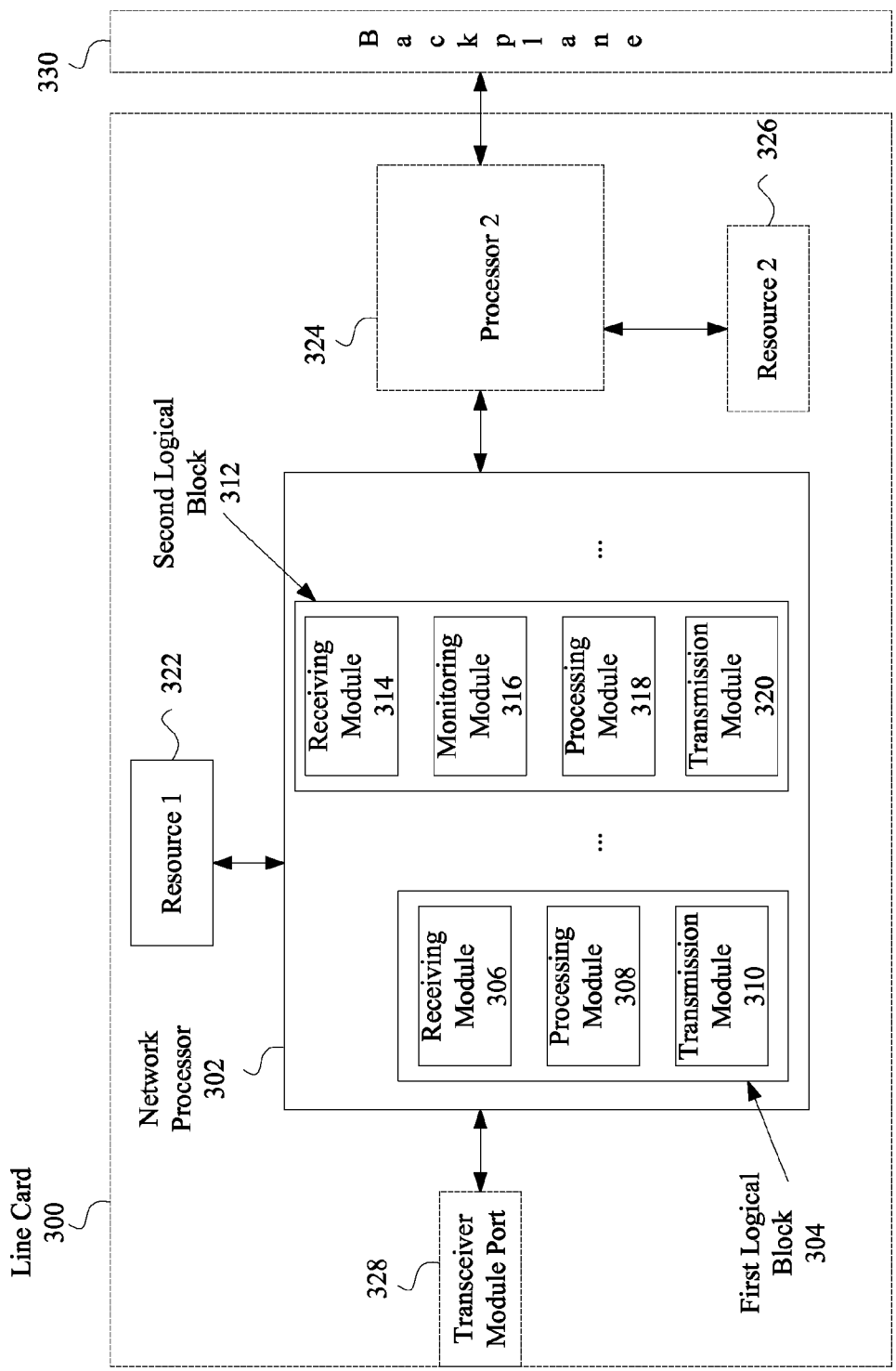
FIG. 3 is a system diagram of one embodiment of a network processor implementing a pipeline for processing a data packet.

FIG. 3 is a system diagram of one embodiment of a network processor 302 implementing a pipeline on a line card 300 of a router. A router typically includes multiple line cards 300 (see FIG. 6 and related discussion below for more details regarding the elements of a typical router). Line cards 300 communicate with other line cards 300 in the router through backplane 330, which is essentially a bus for coupling all of the line cards 300 with the router. Each line card 300 can include one or more transceiver module ports 328. As mentioned earlier, transceiver module port 328 is a combination of an ingress port and an egress port, and thus can perform both the transmitting and the receiving of data packets. Each line card 300 can also include a second processor 324, coupled with a second resource 326, for additional processing.

Network processor 302 is coupled with a first resource 322. First resource 322 can provide any functionality to network processor 302, but will typically be a memory resource for storing, reading or writing data. Network processor 302 also implements two logical blocks, a first logical block 304 and a second logical block 312. Additional logical blocks can also be implemented by the network processor 302.

First logical block 304 includes receiving module 306, processing module 308, and transmission module 310. In one embodiment, receiving module 306 receives a descriptor of a data packet from transceiver module port 328 for processing. Processing module 308 processes the descriptor, including generating a write request and a unique identification for the write request. After processing module 308 finishes processing the descriptor, transmission module 310 transmits the write request to first resource 322 and transmits the unique identification for the write request towards second logical block 312. In other embodiments, the write request can be for a different resource other than first resource 322, including second resource 326 or a resource on a different line card in the router. In these embodiments, the write request would be transmitted towards the intended resource by transmission module 310.

Second logical block 312 includes receiving module 314, monitoring module 316, processing module 318, and transmission module 320. After receiving module 314 receives the unique identification of the write request, monitoring module 316 begins monitoring for an acknowledgement for the write request. As noted earlier, processing module 318 can perform processing while monitoring module 316 performs the monitoring. After the acknowledgement is either received or is not received after a predetermined amount of time, transmission module 320 transmits the descriptor. The descriptor can be transmitted upstream in the pipeline, downstream in the pipeline, to second processor 324, to a different line card in the router, or to transceiver module port 328. The particular destination of the descriptor will typically depend on whether the acknowledgement for the write request was received within the predetermined amount of time.

Figure 4A:
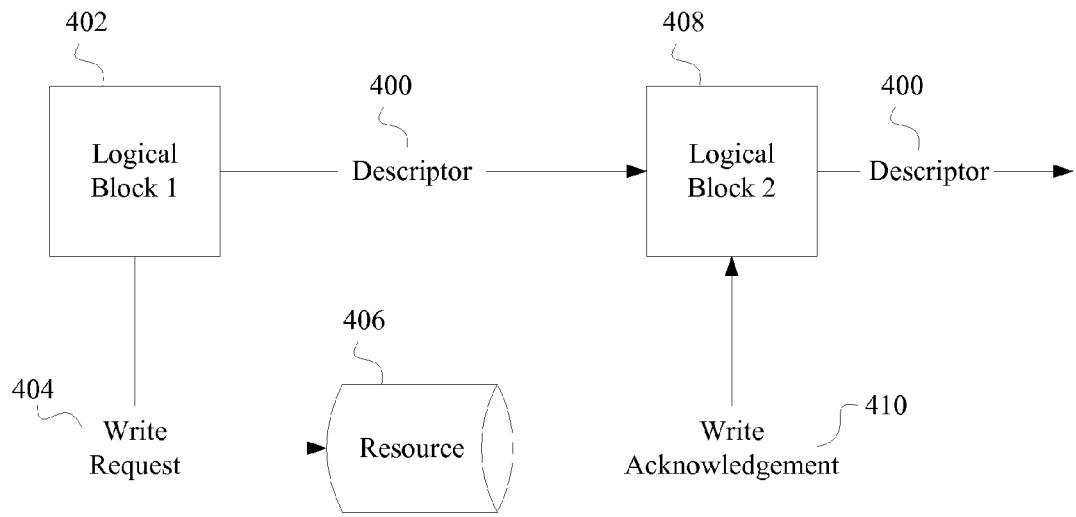
FIG. 4A is a component diagram illustrating the flow of signals in one embodiment of a network processor implementing a pipeline for processing a data packet.

FIG. 4A is a component diagram illustrating the flow of signals in one embodiment of a network processor implementing a pipeline. The process starts when first logical block 402 receives descriptor 400 for processing. First logical block 402 generates write request 404 including a unique identification. Write request 404 is transmitted to resource 406, and descriptor 400 along with the unique identification code is transmitted towards second logical block 408. After second logical block 408 receives descriptor 400 and the unique identification code, second logical block 408 begins monitoring for write acknowledgement 410 from resource 406. After write acknowledgement 410 is received by second logical block 408 and processing has completed at second logical block 408, descriptor 400 is transmitted from second logical block 408 for further processing or to an egress port for transmission into the network.

Figure 4B:
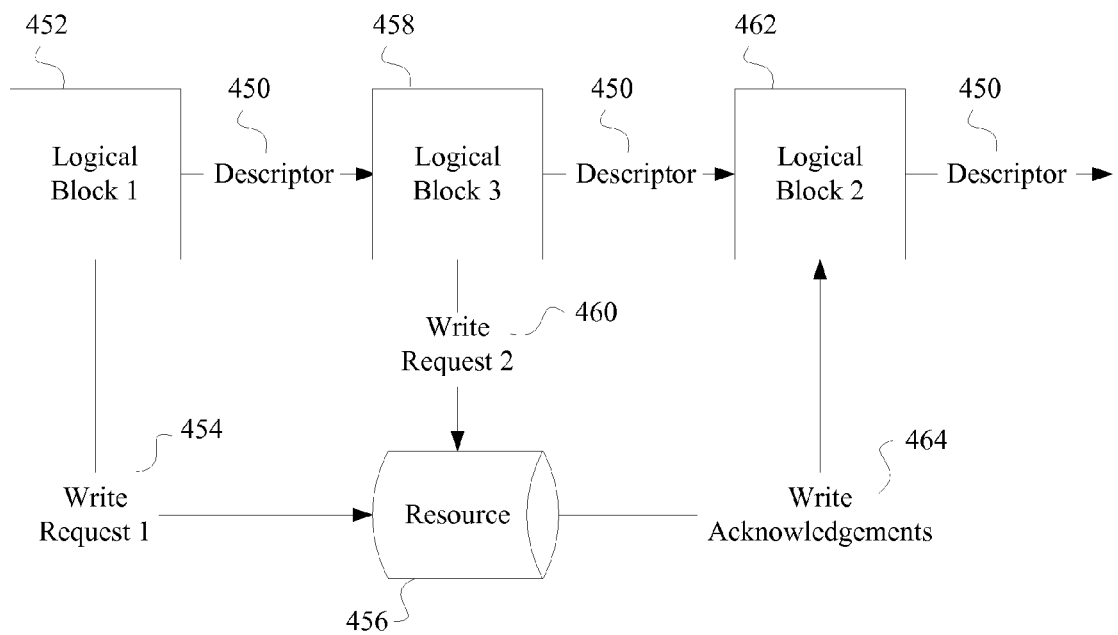
FIG. 4B is a component diagram illustrating the flow of signals in another embodiment of a network processor implementing a pipeline for processing a data packet.

FIG. 4B is a component diagram illustrating the flow of signals in another embodiment of a network processor implementing a pipeline. This embodiment illustrates that more than one resource request can be generated during processing in the pipeline. Furthermore, the requests can be generated at different stages of the pipeline. While only one example embodiment is illustrated for implementing such a configuration, other embodiments are also possible using the techniques described herein, some of which are detailed below.

Furthermore, the numbering assigned to the logical blocks in this diagram is for the sake of consistency, and not according to the order of processing, as noted above.

The process starts when first logical block 452 receives descriptor 450 for processing. First logical block 452 generates a first write request 454, including a unique identification for first write request 454, and transmits first write request 454 to resource 456. First logical block 452 also transmits descriptor 450 along with the unique identification for first write request 454 towards third logical block 458 after processing has completed at first logical block 452.

Third logical block 458, after receiving descriptor 450, begins processing descriptor 450. As part of the processing, third logical block 458 generates second write request 460 (including a unique identification for second write request 460) and transmits second write request 460 to resource 456. It should be noted that first request 454 and second request 460 are intended for the same resource 456 in this embodiment only for the purpose of simplifying the diagram. Thus, in other embodiments, first request 454 can be transmitted to a different resource than second request 460. Having completed processing at third logical block 458, descriptor 450 along with the unique identifications for both write requests 454 and 460 are transmitted towards second logical block 462.

After receiving descriptor 450, second logical block 462 begins monitoring for write acknowledgements 464 for both write requests 454 and 460. Again, it should be noted that both acknowledgements are monitored for at the same logical block only for the purpose of simplifying the diagram. In other embodiments, the two acknowledgements can be monitored for at different logical blocks. After both write acknowledgements 464 are received and processing has completed at second logical block 462, descriptor 450 is transmitted onwards either for additional processing or for transmission into the network at an egress port.

Figure 5:
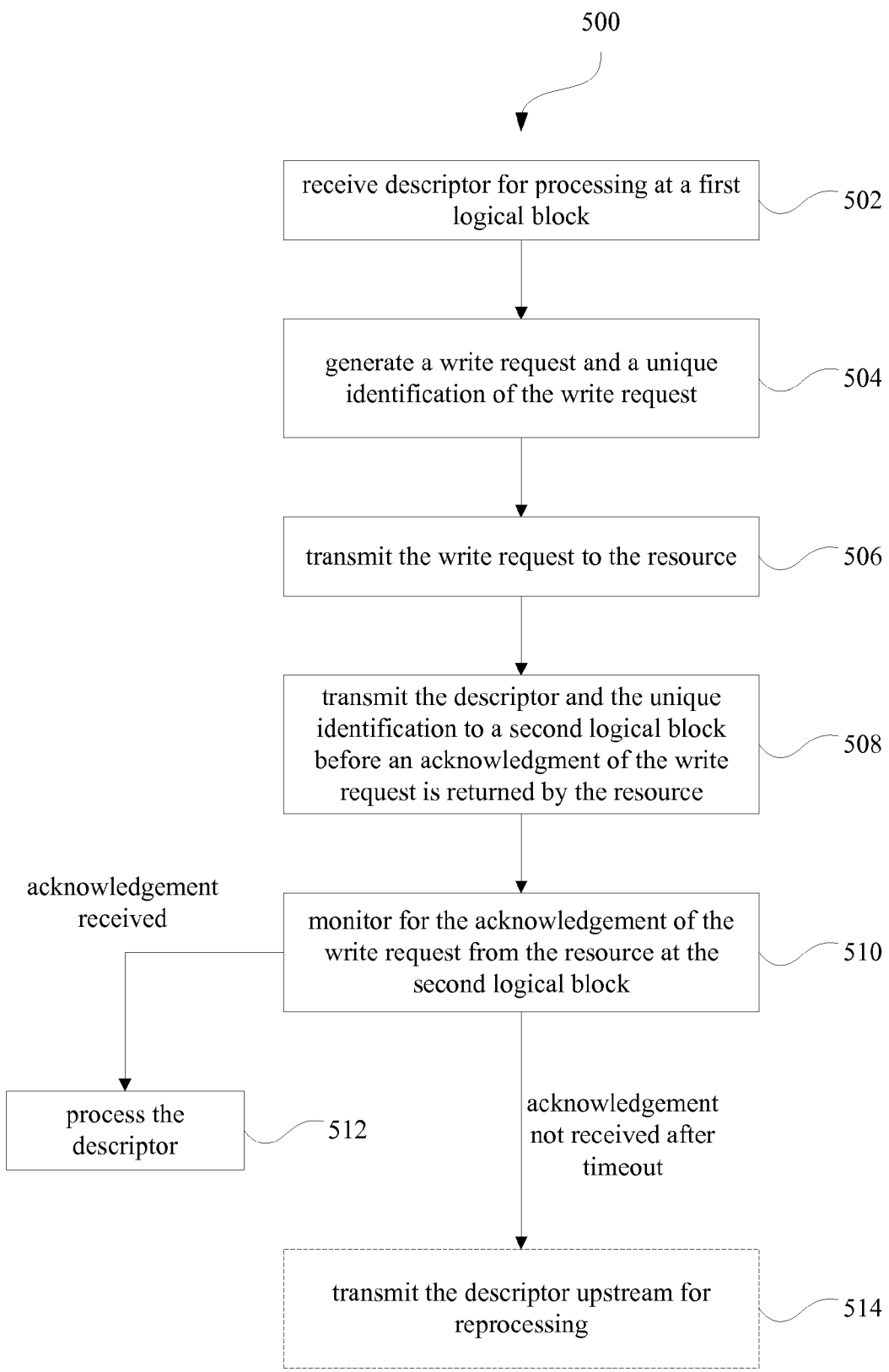
FIG. 5 is a flowchart of one exemplary embodiment of a method implemented in a pipeline for processing a data packet.

FIG. 5 is a flowchart of one exemplary embodiment of a method implemented in a pipeline for processing a data packet. At Block 502, the first logical block of the pipeline receives a descriptor of a data packet for processing. The processing includes accessing a resource to perform an operation, which happens to be a write operation in this embodiment. At Block 504, the first logical block generates a write request for the write operation, including a unique identification for the write request. At Block 506, the write request, including the unique identification, is transmitted from the first logical block to the resource. At Block 508, the descriptor and the unique identification of the write request is transmitted from the first logical block towards a second logical block before an acknowledgement for the write request is returned by the resource.

In response to receiving the descriptor and the unique identification of the write request, the second logical block monitors for the acknowledgement for the write request from the resource (Block 510). If the acknowledgement is received, the second logical block processes the descriptor (Block 512). Optionally, if the acknowledgement is not received after a predetermined amount of time has elapsed, the descriptor is transmitted upstream in the pipeline for reprocessing at the first logical block (Block 514).

Figure 6:
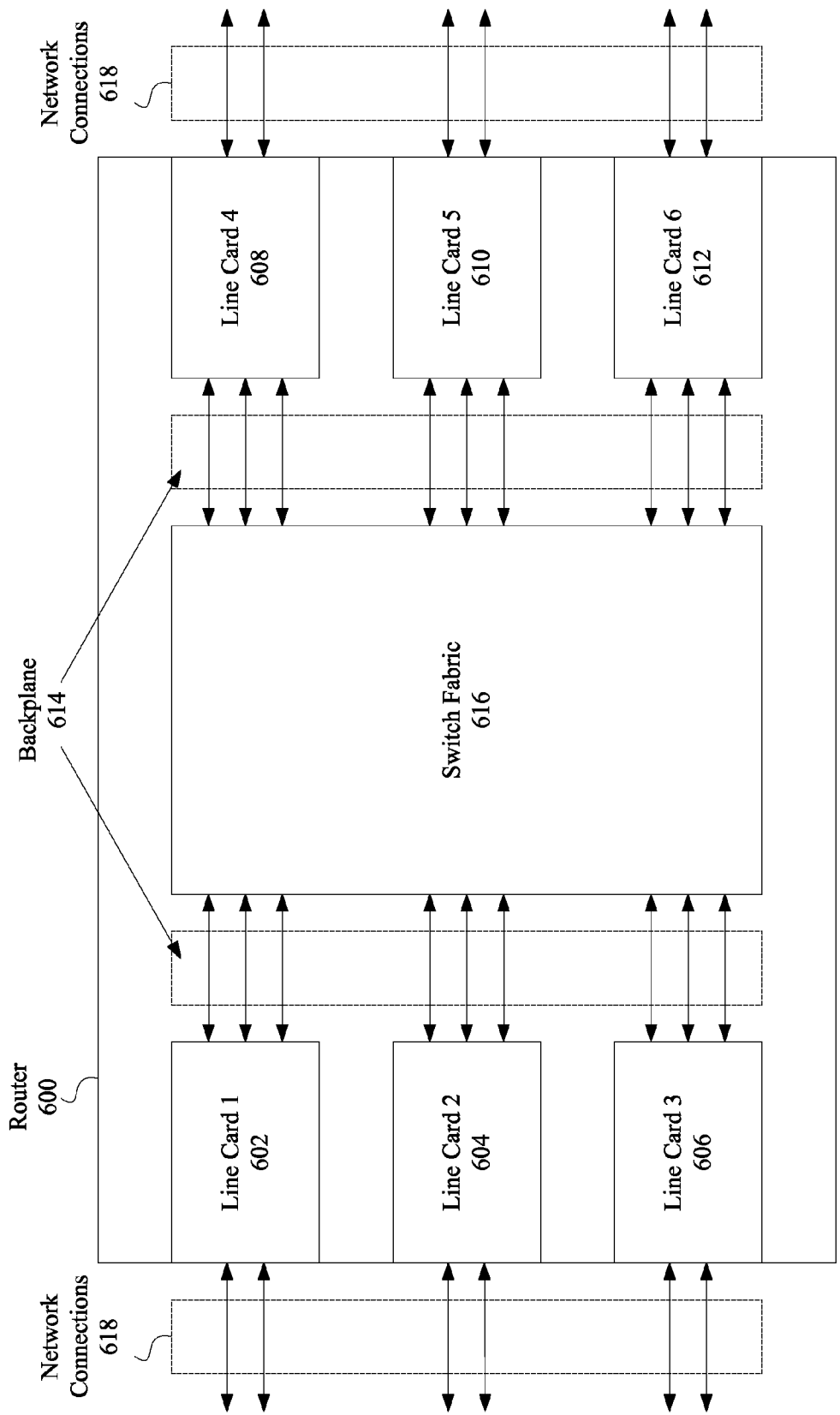
FIG. 6 is a diagram of one exemplary embodiment of a system for routing a data packet, the system including a network processor implementing a pipeline for the processing of the data packet.

FIG. 6 is a diagram of one exemplary embodiment of a system for routing a data packet, the system including a network processor implementing a pipeline. In this embodiment, the system is implemented in router 600. Router 600 includes multiple line cards 602-612. Although six line cards are illustrated in this diagram, a router can have any number of line cards. Switch fabric 616 forms a connection between the line cards 602-616, and each line card is coupled to switch fabric 616 through backplane 614. The line cards 602-612 also have network connections 618 for transmitting and receiving data packets through the network.

Although not illustrated in the diagram, each line card 602-612 includes a network processor implementing a pipeline for processing the data packet (see FIG. 3 and related discussion above for more details). After the data packet is received through network connection 618, the receiving line card processes the data packet according to any one of the embodiments described herein. During processing, a determination is made regarding which line card will be the destination line card for transmitting the data packet back out into the network. This determination is typically based on information contained in the descriptor portion of the data packet. However, other information can also be a factor in making the determination, including information from the data portion of the packet.

After processing is completed at the receiving line card, the data packet is transmitted towards the determined destination line card through backplane 614 and switch fabric 616. In some cases, the destination line card can be the same as the receiving line card, in which case no transmission is necessary. Additional processing can be performed at the destination line card before the data packet is transmitted back out into the network through a network connection 618. In this manner, router 600 performs processing on each data packet received and thereby routes the data packet to the proper communication channel for delivery to its intended destination terminal.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method executed by a network processor implementing a pipeline for processing a data packet, where the pipeline includes a plurality of logical blocks, where each of the plurality of logical blocks is configured to process a stage of the pipeline, where the data packet includes a descriptor and a data, and where the network processor is coupled to a resource for storing the data, the method to reduce latency and enable non-blocking processing of the data packet by forwarding a unique identification of a write request from a first logical block in the plurality of logical blocks to a second logical block in the plurality of logical blocks that is subsequent to the first logical block, the write request to modify the data in the resource, the method comprising the steps of:
   receiving the descriptor of the data packet for processing at the first logical block in the pipeline executed by the network processor;
   generating the write request and the unique identification of the write request at the first logical block;
   transmitting the write request from the first logical block to the resource;
   transmitting the unique identification from the first logical block toward the second logical block before an acknowledgment of the write request is returned by the resource;
   receiving the unique identification at the second logical block;
   monitoring for the acknowledgement of the write request from the resource at the second logical block;
   processing the descriptor in response to receiving the acknowledgment of the write request; and
   transmitting the descriptor upstream in the pipeline for reprocessing at the first logical block in response to not receiving the acknowledgement after an amount of time has elapsed.

2. The method of claim 1, wherein transmitting the unique identification toward the second logical block further comprises the step of:
   transmitting the unique identification from the first logical block to a third logical block between the first logical block and the second logical block in the pipeline.

3. The method of claim 2, further comprising the steps of:
   generating a second write request and a second unique identification of the second write request at the third logical block;
   transmitting the second write request from the third logical block to the resource; and
   transmitting the second unique identification from the third logical block toward the second logical block before a second acknowledgment of the second write request is returned by the resource.

4. The method of claim 1, further comprising the steps of:
receiving a second unique identification of a second write request at the second logical block;
monitoring for a second acknowledgement of the second write request from the resource at the second logical block; and
processing the descriptor in response to receiving the second acknowledgment of the second write request.

5. The method of claim 1, further comprising the step of:
writing the unique identification by the first logical block into the descriptor.

6. The method of claim 1, further comprising the step of:
transmitting by the first logical block the descriptor along with the unique identification toward the second logical block.

7. The method of claim 1, further comprising the step of:
receiving the data packet along with the descriptor at the first logical block.

8. The method of claim 1, further comprising the step of:
transmitting the data along with the write request to the resource.

9. A network processor implementing a pipeline for processing a data packet, wherein the pipeline includes a plurality of logical blocks, wherein each of the plurality of logical blocks is configured to process a stage of the pipeline, wherein the data packet includes a descriptor and a data, and wherein the network processor is coupled to a resource for storing the data, the network processor to reduce latency and enable non-blocking processing of the data packet by forwarding a unique identification of a write request from a first logical block in the plurality of logical blocks to a second logical block in the plurality of logical blocks that is subsequent to the first logical block, the write request to modify the data in the resource, the network processor comprising:
a first receiver in the first logical block configured to receive the descriptor of the data packet for processing at the first logical block in the pipeline executed by the network processor;
a first processor in the first logical block configured to generate the write request and the unique identification of the write request; and
a first transmitter in the first logical block coupled to the first processor in the first logical block and configured to transmit the write request from the first logical block to the resource, and further configured to transmit the unique identification from the first logical block toward the second logical block before an acknowledgment of the write request is returned by the resource;
a second receiver in the second logical block configured to receive the unique identification;
a monitor in the second logical block configured to monitor for the acknowledgement of the write request from the resource;
a second processor in the second logical block coupled to the monitor in the second logical block and configured to process the descriptor in response to receiving the acknowledgment of the write request; and
a second transmitter in the second logical block configured to transmit the descriptor upstream in the pipeline for reprocessing at the first logical block in response to not receiving the acknowledgement after an amount of time has elapsed.

10. The network processor of claim 9, wherein the first transmitter in the first logical block transmits the unique identification toward the second logical block by transmitting the unique identification from the first logical block to a third logical block between the first logical block and the second logical block in the pipeline.

11. The network processor of claim 10, further comprising:
a third processor in the third logical block configured to generate a second write request and a second unique identification of the second write request; and
a third transmitter in the third logical block coupled to the third processor in the third logical block and configured to transmit the second write request from the third logical block to the resource, and further configured to transmit the second unique identification from the third logical block toward the second logical block before a second acknowledgment of the second write request is returned by the resource.

12. The network processor of claim 9, wherein the second receiver in the second logical block is further configured to receive a second unique identification of a second write request, wherein the monitor in the second logical block is further configured to monitor for a second acknowledgement of the second write request from the resource, and wherein the second processor in the second logical block is further configured to process the descriptor in response to receiving the second acknowledgment of the second write request.

13. The network processor of claim 9, wherein the first processor in the first logical block is further configured to write the unique identification into the descriptor.

14. The network processor of claim 9, wherein the first transmitter in the first logical block is further configured to transmit the descriptor along with the unique identification toward the second logical block.

15. The network processor of claim 9, wherein the first receiver in the first logical block is further configured to receive the data packet along with the descriptor at the first logical block.

16. The network processor of claim 9, wherein the first transmitter in the first logical block is further configured to transmit the data along with the write request to the resource.

* * * * *